(12) United States Patent
Streibig et al.

(10) Patent No.: US 7,381,006 B2
(45) Date of Patent: Jun. 3, 2008

(54) DEVICE FOR FASTENING COMPONENTS

(75) Inventors: Kurt Streibig, Rekawinkel (AT);
Wolfgang Klein, Neusiedl/See (AT);
Robert Schulz, Vienna (AT)

(73) Assignee: Inventio AG, Hergiswil (CH)

( * ) Notice: Subject to any disclaimer, the term of this patent is extended or adjusted under 35 U.S.C. 154(b) by 12 days.

(21) Appl. No.: 11/325,950

(22) Filed: Jan. 5, 2006

(65) Prior Publication Data

US 2006/0151286 A1 Jul. 13, 2006

(30) Foreign Application Priority Data

Jan. 7, 2005 (EP) ................................. 05405006

(51) Int. Cl.
*B25G 3/36* (2006.01)
*E04G 7/00* (2006.01)
*F16B 21/08* (2006.01)

(52) U.S. Cl. .................... 403/397; 24/292; 24/545; 248/228.7; 248/231.81

(58) Field of Classification Search ................ 403/387, 403/397; 248/228.7, 72, 231.81; 52/360, 52/714, 715, 506.06; 198/326, 321, 860.2; 24/293–295, 297, 545

See application file for complete search history.

(56) References Cited

U.S. PATENT DOCUMENTS

| 487,553 | A | * | 12/1892 | Cole | 297/156 |
| 1,125,123 | A | * | 1/1915 | Zibell | 137/552.5 |
| 1,750,106 | A | * | 3/1930 | Heltzel | 404/135 |
| 1,838,123 | A | * | 12/1931 | White | 403/387 |
| 2,497,820 | A | * | 2/1950 | Kielland | 403/390 |
| 2,657,890 | A | * | 11/1953 | Stuart | 248/68.1 |
| 3,102,614 | A | * | 9/1963 | Lydard | 403/387 |
| 3,257,767 | A | * | 6/1966 | Lassy | 52/649.8 |
| 3,276,180 | A | * | 10/1966 | Westinghouse | 52/489.1 |
| 3,893,212 | A | * | 7/1975 | Curry | 24/462 |
| 3,999,258 | A | * | 12/1976 | Curry | 24/462 |
| 4,038,727 | A | * | 8/1977 | Robbins | 24/461 |
| 4,332,060 | A | * | 6/1982 | Sato | 24/67.9 |
| 4,332,362 | A | * | 6/1982 | Leopold | 248/229.26 |
| 4,576,496 | A | * | 3/1986 | Schwarz et al. | 400/352 |
| 4,584,806 | A | * | 4/1986 | Graham, Jr. | 52/285.3 |
| 4,783,029 | A | * | 11/1988 | Geppert et al. | 248/74.1 |
| 4,792,122 | A | * | 12/1988 | Smrt | 256/68 |
| 4,875,553 | A | | 10/1989 | Smith et al. | |
| 4,892,276 | A | * | 1/1990 | Alessio | 248/74.1 |

(Continued)

FOREIGN PATENT DOCUMENTS

DE 1 070 801 12/1959

(Continued)

*Primary Examiner*—Robert J. Sandy
*Assistant Examiner*—Nahid Amiri
(74) *Attorney, Agent, or Firm*—Schweitzer Cornman Gross & Bondell LLP

(57) ABSTRACT

A clip for joining bearing elements, such as found in escalator constructions may be employed, for example, to join a track rail, on which rollers of an escalator roll to a carrier frame. The clip has a base part and a bracket part of spring steel. At the upper end of each side, the base part has a shoulder to engage one of the elements to be joined. The bracket part has a lug which engages the other element to be joined and, through a further lug, presses the shoulders of the base part against the first element to retain the two elements in the desired contacting position.

7 Claims, 4 Drawing Sheets

U.S. PATENT DOCUMENTS

| | | | | |
|---|---|---|---|---|
| 4,939,883 A * | 7/1990 | Swenson | ................... | 52/686 |
| 5,788,403 A * | 8/1998 | Dison et al. | ............... | 403/397 |
| 5,819,476 A * | 10/1998 | Annestedt, Sr. | ............... | 52/11 |
| 5,832,690 A * | 11/1998 | Kaines | ................... | 52/677 |
| 6,352,383 B1 * | 3/2002 | Ristola | ................... | 403/254 |
| 6,955,254 B2 * | 10/2005 | Krampl | ................... | 198/326 |
| 6,966,324 B2 * | 11/2005 | Guido | ................... | 135/120.4 |
| 7,143,563 B1 * | 12/2006 | Palmer | ................... | 52/677 |

FOREIGN PATENT DOCUMENTS

| | | |
|---|---|---|
| EP | 1 188 706 B1 | 3/2002 |
| FR | 75 34104 | 6/1976 |
| WO | WO 2004/046487 A2 | 6/2004 |

\* cited by examiner

DEVICE FOR FASTENING COMPONENTS

The present invention relates to a device for fastening components of bearing parts.

BACKGROUND OF THE INVENTION

DE 1 070 801 discloses an escalator with aligned side walls, an upper wall with a handrail and a lower wall and steps. Mounting brackets, which carry the track rails, are disposed at the side walls, two track rails being provided for the advancing escalator belt and two for the returning escalator belt. A pair of rollers is disposed on each side of each step, the rollers rolling on the track rails, which are provided with rims.

Generally known rail holders, rail clamps or screw connections or welded connections are used for fastening the track rails to the mounting brackets.

It is a disadvantage of the known devices that, at about one meter intervals, eight mounting brackets must be fastened to the sidewalls and the track rails fastened to the mounting brackets. The large expenditure of work required by conventional fastening means leads to high installation and assembly costs.

The present invention provides a remedy. The invention accomplishes the objective of avoiding the disadvantages of the known devices and of bringing about a simplification of the installation of components at bearing parts.

The invention is a connecting device in the form of an independent clip unit able to detachably join two components, and particularly bearing components such as may be found in escalator structures. The clip has surfaces that bear against the components to be joined. A spring-like flexibility in the clip retains the clip surfaces against the components and thus the components against each other, maintaining the components in the desired engaged position.

In a first embodiment, the invention is a two-piece construction comprising a base and a bracket having a spring-like flexibility. The base bears against one of the components to be joined, while the bracket bears against the bracket and other component, its spring-like flexibility being biased to cause the components to be retained in a desired contacting relationship.

In a second embodiment, the clip is of one-piece construction, with shoulders that engages one of the components and a flexible portion that joins to a foot that engages the other component. The forces exerted by the flexible portion against the shoulders and foot draws the components together to retain them in the desired contacting relationship.

The advantages achieved by the invention may be seen to lie essentially therein in that, with the inventive clip, track rails or other components can be installed quickly with simple means and at little expense. The installation work for the track rails is shortened significantly, as the inventive clip may be installed manually, with hand pressure applied directly, by a hammer blow, by pressure applied by a U-bolt, or the like, which is sufficient for the installation. The inventive clip makes the installation significantly faster, easier and cheaper than previously. The track rail can also be replaced completely or partly more easily.

In the further course of the specification, the invention is shown in relation to an escalator. However, the disclosure applies equally well also to a moving walkway or to other devices.

BRIEF DESCRIPTION OF THE DRAWINGS

The present invention is explained in greater detail by means of the attached Figures, in which.

DETAILED DESCRIPTION OF THE INVENTION

Figure 1:
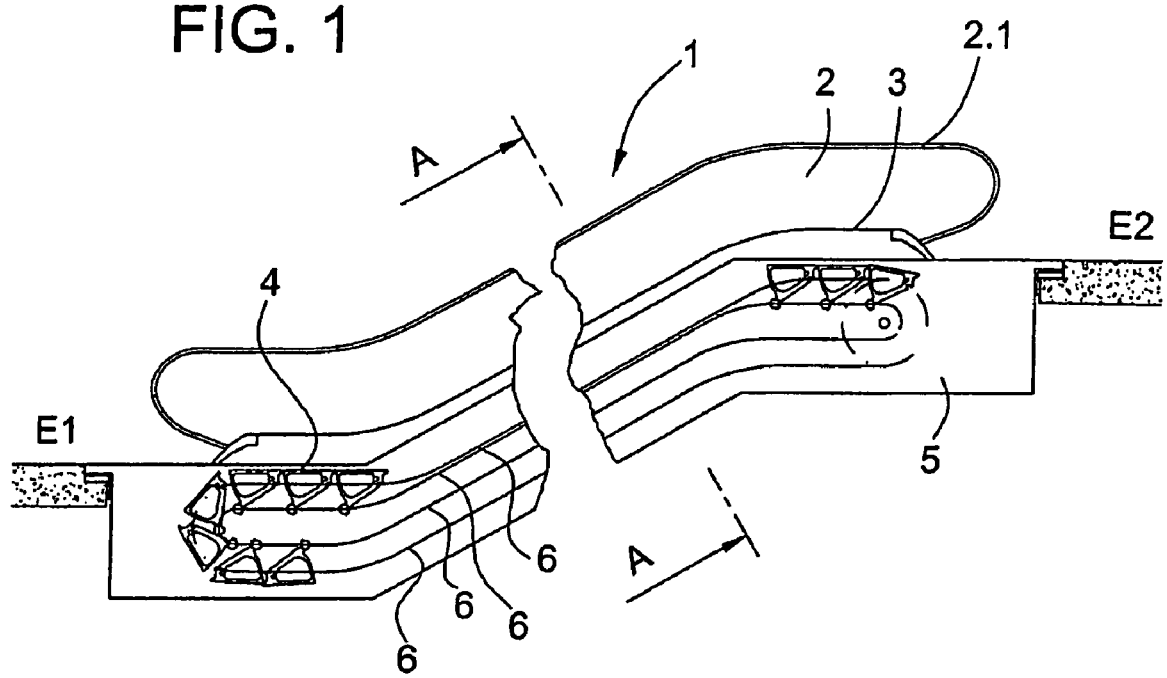
FIG. 1 is a schematic view of an escalator with track rails with which the invention may be employed.
Figure 2:
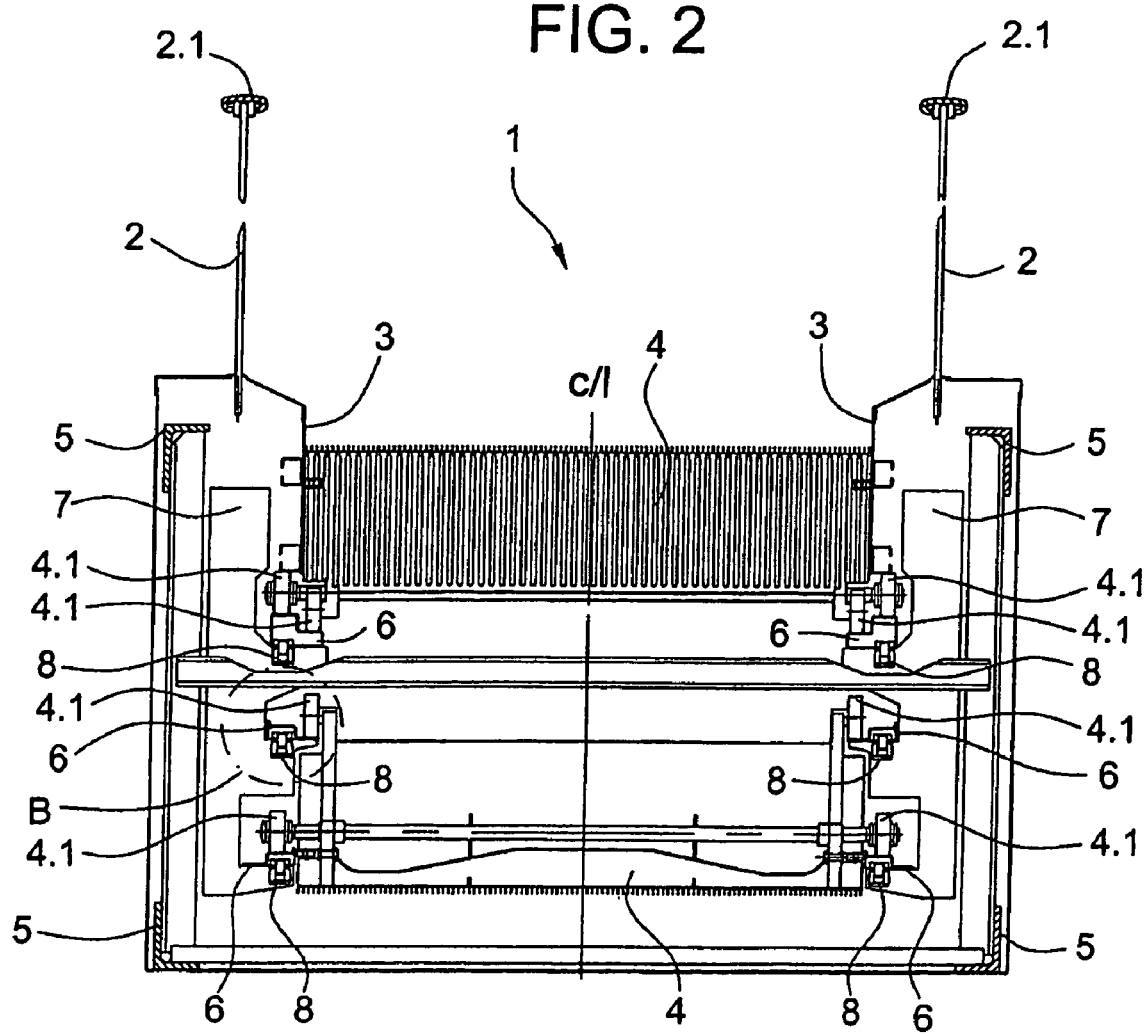
FIG. 2 is a section view in elevation, taken along line A-A of FIG. 1, wherein the escalator frame functions as a support for the track rails, showing the inventive clips installed.

FIGS. 1 and 2 show an escalator 1 with balustrades 2, each carrying a handrail 2.1, and steps 4 guided laterally between metal pedestal sheets 3, the escalator 1 connecting a first floor E1 with a second floor E2. Rollers 4.1 of the steps 4 move on track rails 6, which are fastened to a series of frames 7 by means of the inventive clips 8, the clips 8 locking with the rails 6 and frames 7, which are to be connected. Each frame 7 is connected to a truss 5 of the escalator 1, for example, by means of a bolted, welded, or pressing connection.

Figure 3:
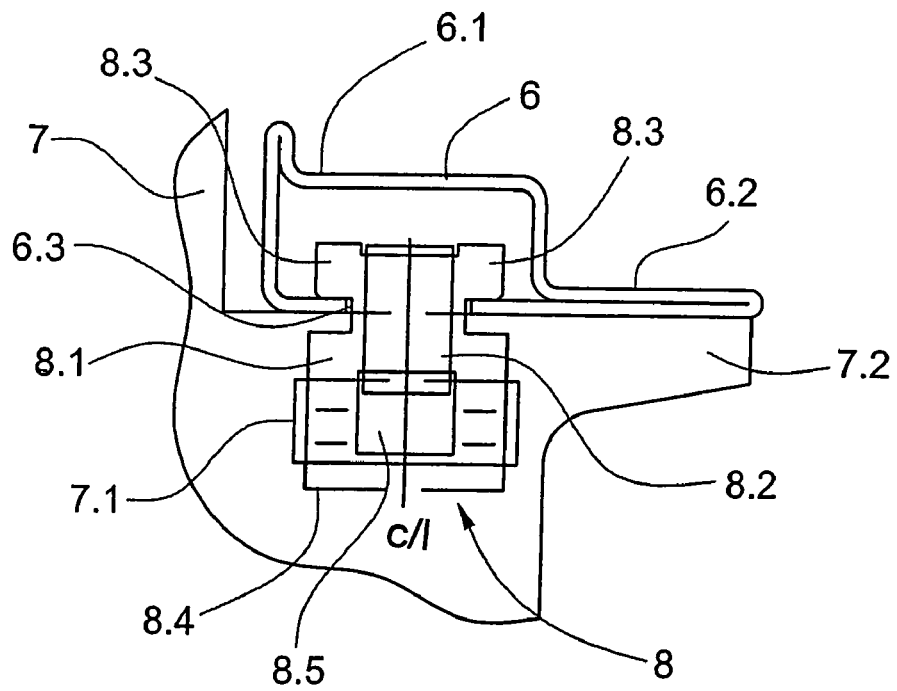
FIG. 3 is a detail view of section B in FIG. 2 and details the invention in the form of a clip having a two-part construction.

FIG. 3 is an enlarged view of section B in FIG. 2, and details the inventive clip 8 in a two-part construction. The track rail 6, consisting of a hollow profile member, has a first running surface 6.1 and a second running surface 6.2 on which the rollers 4.1 ride, and a foot gap 6.3. The two-part clip 8 detachably connects the track rail 6 with the frame 7, the track rail 6 being carried by a bearing surface 7.2 of the frame 7.

In the two-part construction, the clip 8 comprises of a base part 8.1 of, for example, non-springy steel and a bracket part 8.2, which is of a spring steel and detachably connects the base part 8.1 with the frame 7 and the track rail 6. At the upper end of each side, the base part 8.1 has a shoulder 8.3. For installing the clip 8, the base part 8.1 is rotated through 90° with respect to its orientation as shown in the Figures, so that the shoulders 8.3 align with the length of the gap 6.3, which is disposed in the longitudinal direction in the track rail foot. Subsequently, the base part 8.1 is turned back into the starting position as shown and the lug portion 8.4 of the base part 8.1 is pushed into a recess 7.1 of the frame 7, the shoulders 8.3 resting on the track rail 6 on both sides of the gap 6.3 of the track rail 6.

Figure 4:
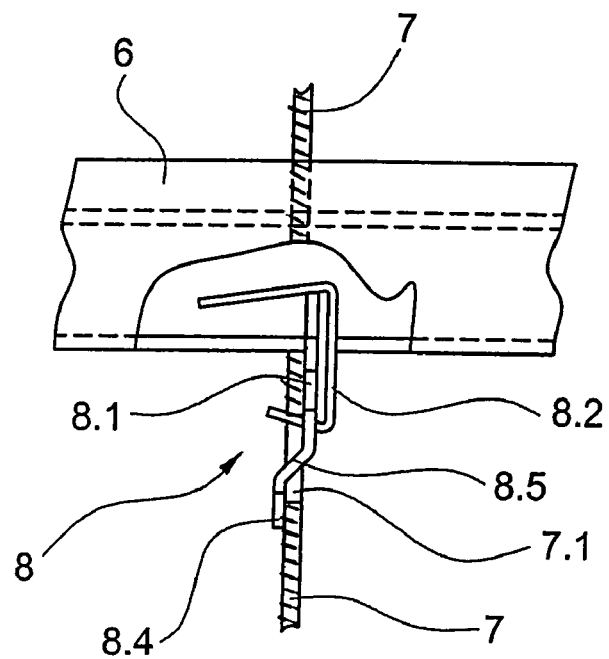
FIG. 4 is a side view of the clip of FIG. 3 in an installed position.
Figure 5:
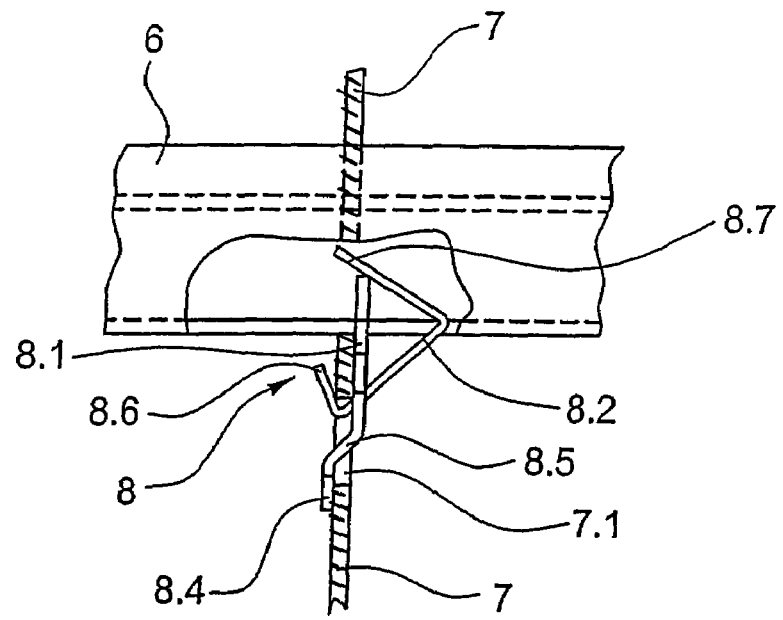
FIG. 5 is a side view of the clip of FIG. 3 in a relaxed state.

As shown in FIG. 5, lug portion 8.6 at one end of the bracket part 8.2 is introduced through a recess 8.5 of the base part 8.1 into the recess 7.1 of the frame 7, the lug 8.6 projecting behind and gripping the frame 7. A second lug portion 8.7 at the other end 8.2 of the bracket is pushed over the upper end of the base part 8.1 between the shoulders 8.3 until the bracket part 8.2 has reached the position shown in FIG. 4.

The bracket part 8.2, through lug 8.6, bears against the frame 7 at the upper edge of the recess 7.1 and, with the lug 8.7, presses shoulders 8.3 of the base part 8.1 at the shoulders 8.3 against the track rail 6. As a result, the track rail 6 can no longer be shifted with respect to the frame 7. Consequently, the track rail 6 is joined together with the frame 7 and accordingly positioned. By these means, the track rail 6 can be precisely positioned on the frame accurately, for example, to the nearest millimeter. Neither horizontal nor lateral displacement is possible.

Figure 6:
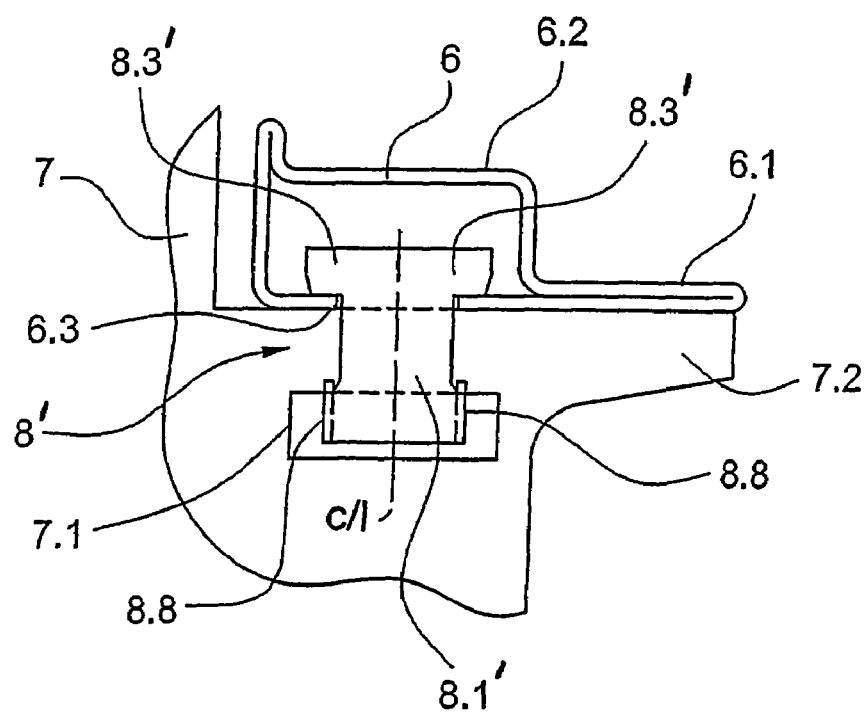
FIG. 6 is a detail view of section B in FIG. 2 detailing the inventive clip in a one-part construction.
Figure 7:
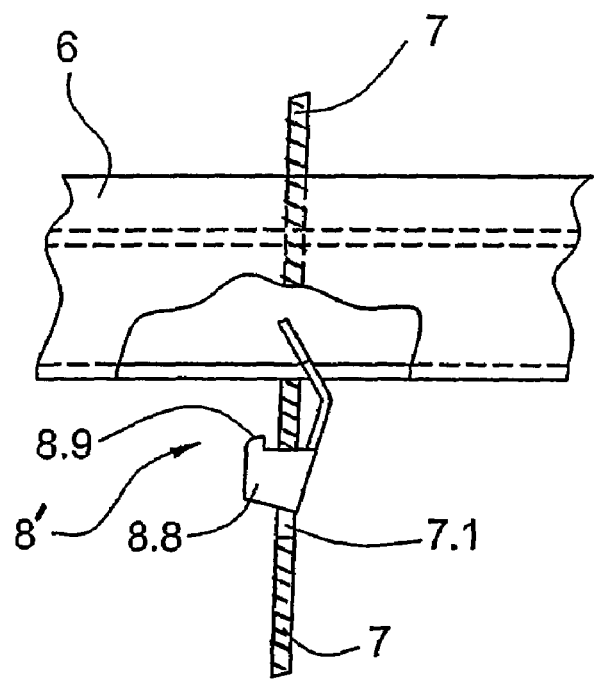
FIG. 7 is a side view of the clip of FIG. 6 in an installed position.
Figure 8:
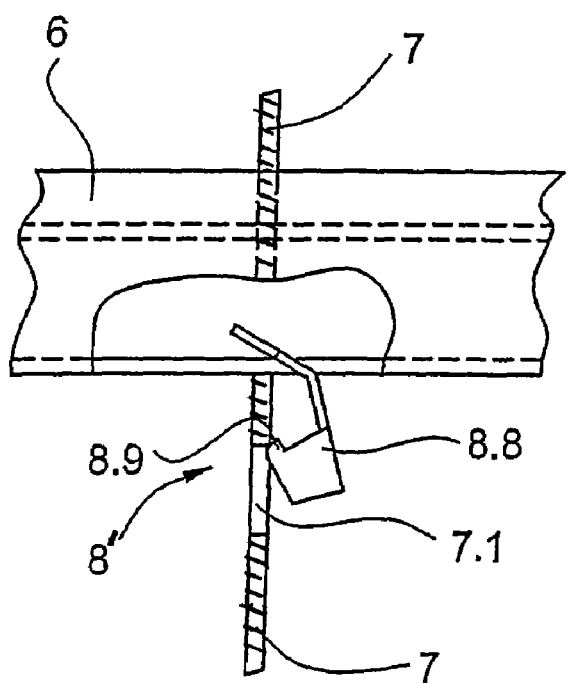
FIG. 8 is a side view of the clip of FIG. 6 in a relaxed state.

FIG. 6 shows the section B of FIG. 2 with details of the inventive clip 8' in a one-part construction. As shown therein, the clip 8' comprises a base part 8.1' of spring steel, which, at its upper end, has a shoulder 8.3' on each side and, at its lower end, a foot 8.8 with a lug 8.9 (FIG. 7). The base part 8.1', which is bent in the center, acts like a spring. For installing the clip 8', the base part 8.1' is again rotated through 90° from the orientation in FIG. 6, so that the shoulders 8.3' can be pushed into the gap 6.3 disposed in the longitudinal direction in the track rail foot. The base part 8.1' is then turned back into the starting position and the lug 8.9' of the foot 8.8 is positioned in front of the recess 7.1 of the frame 7, the shoulders 8.3 resting on either side of the gap 6.3 of the track rail 6. The foot 8.8 reaches the end position, shown in FIG. 7, by means of a blow with a hammer or by means of the force of a pressing tool applied to the base part, such as at the location of the bend, driving the lug through the recess. In the end position the lug 8.9 is behind the support retaining the foot 8.8 and the support 7 at the recess 7.1 edge and the foot 8.8 bears against the support 7 by means of the spring action of the base part 8.1'. The track rail 6 is pressed against the bearing surface 7.2 of the support 7 by the shoulders 8.3'.

The two-part construction of the clip 8 can be used repeatedly, as can the one-part construction 8' if an appropriate tool is used for the dismantling.

Other components, such as parts of the balustrade pedestal, an illumination system, brush deflector, etc., can also be fastened by means of clips at the bearing parts of the escalator. For connecting the track rail as well as for connecting the other components with bearing parts, the inventive clip can be one of the connecting elements, and is manufactured independently and separately from the parts that are to be connected and, because of its shape and its spring properties, connects the parts detachably. The clip parts can be produced easily and cost effectively in large numbers by stamping and bending. With the example shown above of connecting simple profiled goods for the track rail with frames produced simply by a stamping process, a further advantage is demonstrated, namely that, with the inventive clip connection, the parts that are to be connected may also be constructed simply without requiring, for example, catch hooks, tabs, locking parts, detent elements, etc. at the locations to be connected.

The inventive device for fastening components at bearing parts may also be used for devices other than escalators and moving walkways, such as elevators, aerial cableways or other conveying devices and machine constructions.

We claim:

1. A device for fastening first and second components together in a contacting relationship with abutting contact surfaces, comprising a clip manufactured independently of and separately from the components to be fastened, the clip having a shape and spring properties to connect the components detachably, the clip comprising a base part and a separate bracket part removably joinable to the base part, the base part having shoulders at one end to engage with the second component and apply a contact force against the second component in a direction towards the abutting contact surface of the first component and towards a second end of the base part, an aperture between the one end and the second end to receive the bracket part, and a lug at the second end to removably engage the first componet; the bracket part having contact surfaces for engaging the base part one end and the first component and having spring properties to apply a force directly against the shoulders of the base part in the same direction of the contact force to generate the contact force of the base against the second component.

2. The device of claim 1, characterized in that the clip is in one part and has a base part with spring properties.

3. The device of claim 2, characterized in that the base part has shoulders at one end to engage one of the components and a foot at another end, the foot having a lug to engage the other component, the base part being bent at a center to provide a spring force.

4. The device of claim 1, characterized in that the contact surfaces of the bracket part comprise a lug at one end for engaging the first component and a lug at another end for engaging the base part one end.

5. The device of claim 1 wherein the base part shoulders and lug lie in offset planes.

6. The device of claim 1 wherein the bracket contact surface for engaging the first component extends through the base part aperture.

7. The device of claim 4 wherein the lug for engaging the first component extends through the base part aperture.

* * * * *